(12) United States Patent
Huffer

(10) Patent No.: US 10,059,500 B2
(45) Date of Patent: *Aug. 28, 2018

(54) RE-SEALABLE PACKAGES WITH INDEPENDENTLY PEELABLE LIDDING MEMBER PORTIONS

(71) Applicant: SONOCO DEVELOPMENT, INC., Hartsville, SC (US)

(72) Inventor: Scott William Huffer, Hartsville, SC (US)

(73) Assignee: SONOCO DEVELOPMENT, INC., Hartsville, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/897,582

(22) Filed: Feb. 15, 2018

(65) Prior Publication Data

US 2018/0170643 A1    Jun. 21, 2018

Related U.S. Application Data

(60) Continuation of application No. 15/717,508, filed on Sep. 27, 2017, now Pat. No. 9,975,680, which is a
(Continued)

(51) Int. Cl.
*B65D 75/58* (2006.01)
*B65D 75/32* (2006.01)
(Continued)

(52) U.S. Cl.
CPC ......... *B65D 75/5855* (2013.01); *B32B 1/02* (2013.01); *B32B 3/02* (2013.01); *B32B 3/10* (2013.01);
(Continued)

(58) Field of Classification Search
CPC .......... B65D 1/36; B65D 25/04; B65D 25/54; B65D 43/02; B65D 51/10; B65D 51/18;
(Continued)

(56) References Cited

U.S. PATENT DOCUMENTS 3,899,080 A * 8/1975 Brunda ................ B65D 75/327
206/531
3,934,749 A * 1/1976 Andrulionas ........... B32B 27/08
(Continued)

FOREIGN PATENT DOCUMENTS

WO    WO 2008/086389 A2    7/2008

*Primary Examiner* — Bryon Gehman
(74) *Attorney, Agent, or Firm* — Nelson Mullins Riley & Scarborough LLP

(57) ABSTRACT

Improved packages and methods for constructing packages are provided that are designed such that the user can peel back a lidding member of the package to reveal an independently peelable portion covering one of the compartments. The independently peelable portion is a layer of the lidding member that maintains the respective compartment in an unopened (sealed) condition until the user independently peels that layer off to access the items in that compartment. The lidding member can be used to re-seal all of the compartments before and/or after the independently peelable portion is removed. The independently peelable portion may include a visual indication of a sealed condition of the compartment that serves as a tamper evidence feature. In multiple-compartment packages, peeling back the lidding member allows the user to access some of the compartments of the package, while at least one of the compartments remains sealed via the independently peelable portion.

20 Claims, 12 Drawing Sheets

Related U.S. Application Data division of application No. 15/050,677, filed on Feb. 23, 2016, now Pat. No. 9,802,744.

(51) Int. Cl.

| | |
|---|---|
| *B65D 65/14* | (2006.01) |
| *B65B 51/10* | (2006.01) |
| *B65D 65/40* | (2006.01) |
| *B65D 77/20* | (2006.01) |
| *B32B 7/06* | (2006.01) |
| *B32B 7/12* | (2006.01) |
| *B32B 27/08* | (2006.01) |
| *B32B 27/32* | (2006.01) |
| *B32B 27/36* | (2006.01) |
| *B32B 1/02* | (2006.01) |
| *B32B 3/02* | (2006.01) |
| *B32B 3/10* | (2006.01) |
| *B65D 25/04* | (2006.01) |
| *B65D 1/36* | (2006.01) |

(52) U.S. Cl.
CPC ............... *B32B 7/06* (2013.01); *B32B 7/12* (2013.01); *B32B 27/08* (2013.01); *B32B 27/32* (2013.01); *B32B 27/36* (2013.01); *B65B 51/10* (2013.01); *B65D 65/14* (2013.01); *B65D 65/40* (2013.01); *B65D 75/327* (2013.01); *B65D 77/2056* (2013.01); *B32B 2250/24* (2013.01); *B32B 2255/10* (2013.01); *B32B 2255/205* (2013.01); *B32B 2307/31* (2013.01); *B32B 2307/514* (2013.01); *B32B 2307/748* (2013.01); *B32B 2439/70* (2013.01); *B65D 1/36* (2013.01); *B65D 25/04* (2013.01); *B65D 2203/12* (2013.01); *B65D 2575/586* (2013.01)

(58) Field of Classification Search
CPC ........ B65D 55/02; B65D 65/14; B65D 65/40; B65D 75/32; B65D 75/327; B65D 75/58; B65D 75/5855; B65D 77/20; B65D 77/2056; B65D 81/24; B65D 81/32; B65D 83/04; B65D 85/00; B65D 2203/12; B65D 2575/586
USPC ............................ 220/359.1–359.3, 500–557
See application file for complete search history.

(56) References Cited

U.S. PATENT DOCUMENTS

| | | | |
|---|---|---|---|
| 4,735,335 A * | 4/1988 | Torterotot | |
| 4,939,332 A * | 7/1990 | Hahn | |
| 5,348,752 A | 9/1994 | Gorlich | |
| 5,375,698 A * | 12/1994 | Ewart | A45C 11/005 220/359.1 |
| 5,439,132 A * | 8/1995 | Gorlich | |
| 5,686,127 A | 11/1997 | Stockley, III et al. | |
| 5,725,311 A * | 3/1998 | Ponsi | B65D 75/5838 206/494 |
| 5,901,848 A * | 5/1999 | Gorlich | B65D 81/245 206/439 |
| 6,048,558 A * | 4/2000 | Feldmeier et al. | |
| 6,161,699 A * | 12/2000 | Gartland | B65D 75/327 206/531 |
| 7,083,818 B2 * | 8/2006 | Pratte | |
| 8,740,003 B2 * | 6/2014 | Elliott | B65D 75/327 206/538 |
| 8,746,490 B2 | 6/2014 | Huffer et al. | |
| 8,893,883 B2 | 11/2014 | Valaie et al. | |
| 9,434,522 B2 * | 9/2016 | Leiner et al. | B65D 75/327 |
| 9,802,774 B2 | 10/2017 | Huffer | |
| 2003/0026875 A1 * | 2/2003 | Aguilar et al. | |
| 2013/0122138 A1 * | 5/2013 | Chappell, Jr. et al. | |
| 2015/0183564 A1 * | 7/2015 | Henderson | |
| 2016/0096667 A1 * | 4/2016 | Huffer | B65D 25/54 220/257.2 |
| 2016/0122109 A1 * | 5/2016 | Clark | B65D 75/3858 220/359.2 |
| 2018/0016075 A1 | 1/2018 | Huffer | |

* cited by examiner

RE-SEALABLE PACKAGES WITH INDEPENDENTLY PEELABLE LIDDING MEMBER PORTIONS

CROSS-REFERENCE TO RELATED APPLICATIONS

This application is a continuation of U.S. patent application Ser. No. 15/717,508 filed Sep. 27, 2017, entitled "Re-Sealable Packages With Independently Peelable Lidding Member Portions", which is a divisional of U.S. patent application Ser. No. 15/050,677 filed Feb. 23, 2016, entitled "Re-Sealable Packages With Independently Peelable Lidding Member Portions", now issued as U.S. Pat. No. 9,802,744, each of which are incorporated by reference herein in their entireties.

BACKGROUND

The present disclosure relates in general to packages for products, and more particularly to structures for sealing and/or resealing packages. The disclosure is especially concerned with single- and multiple-compartment packages that include laminate structures designed to allow at least one of the compartments to be opened in stages, for example, in some embodiments allowing one of multiple compartments to be opened independently of other compartments of the same packages and/or providing evidence of tampering.

Certain types of products are often consumed together. For example, different food products are frequently paired when eaten. Consumers often eat dips (e.g., cheese dip, artichoke dip, hummus, salsa, etc.) using another food (e.g., chips, crackers, vegetables, bread). Because these food pairings are typically eaten together (e.g., one would not typically eat salsa by itself, but rather would eat salsa with chips), a consumer may wish to purchase the foods together, such as during the same visit to a grocery store. At the same time, the foods involved may be different types of foods which are best stored separately and/or in different types of packages, such as foods including liquid components (e.g., the dips) and foods including solid or dry components (e.g., bread, crackers, or chips).

BRIEF SUMMARY

Embodiments of the invention described herein provide improved packages and methods for constructing packages that allow the user to open the package as a whole by lifting off a lidding member, but further allow the user to independently open a compartment of the package subsequent to lifting off the lidding member using an independently peelable portion of a layer of the lidding member that maintains the given compartment in a sealed state even after the lidding member has initially been peeled. In this way, a visual indication that a compartment is sealed may be provided on the independently peelable portion, such that removal of the independently peelable portion (which serves to initially open the compartment) can be visually recognized by the user, even after the lidding member has been resealed to the package to close the compartment. Moreover, multiple compartments may be provided in the package, with the compartments being independently openable, such that different types of goods (e.g., wet versus dry) may be stored in the same package, but may be accessible to the user independently of each other, as described in greater detail below.

Accordingly, in some embodiments, a package is provided that comprises a base member defining a first compartment and a second compartment and a lidding member configured to cover the first and second compartments. The base member may comprise a sealing surface at least partially around each of the first and second compartments. The lidding member may comprise a first layer and a second layer laminated to the first layer via an adhesive layer, wherein the adhesive layer comprises at least a pressure sensitive adhesive (PSA) in a perimeter region of the lidding member. Upon initial peeling of the lidding member away from the base member, an adhered portion of the first layer aligned with the first compartment may be configured to be peeled away with the second layer to provide access to the first compartment, while an independently peelable portion of the first layer aligned with the second compartment may be configured to separate from the second layer and remain attached to the sealing surface of the base member around the second compartment to maintain the second compartment in a sealed configuration. The independently peelable portion of the first layer may be configured to be peeled away from the base member independently of the adhered portion of the first layer to provide access to the second compartment subsequent to peeling away of the second layer. The lidding member may be configured to be re-sealable to the base member via the PSA in the perimeter region of the lidding member to re-close both the first and the second compartments for storing items therein.

In some embodiments, the independently peelable portion of the first layer may be heat sealed to the sealing surface of the base member around a perimeter of the second compartment. The independently peelable portion of the first layer may be defined by a cut line that extends through the first layer. Additionally, the cut line may further define a pull tab of the independently peelable portion of the first layer that is configured to be grippable by a user for peeling away the independently peelable portion from the base member.

The adhered portion of the first layer may be defined by a cut line that extends through the first layer. The adhesive layer may, in some cases, comprise an area void of adhesive between the second layer and the independently peelable portion of the first layer. Additionally or alternatively, the adhesive layer may comprise an area of permanent adhesive between the second layer and the adhered portion of the first layer.

In some cases, the independently peelable portion may comprise a visual indication of a sealed state of the second compartment, such that, upon removal of the independently peelable portion from the base member, the visual indication of the sealed state of the second compartment is removed.

In other embodiments, a package is provided that comprises a base member defining a compartment, where the base member comprises a sealing surface formed by an inner flange and an outer flange, and where the sealing surface defines a channel between the inner flange and the outer flange. The outer flange may define an exterior edge. The package may further comprise a lidding member configured to cover the compartment, and the lidding member may comprise a first layer and a second layer laminated to the first layer via an adhesive layer. The adhesive layer may comprise at least a pressure sensitive adhesive (PSA) in a perimeter region of the lidding member aligned with the outer flange.

Upon initial peeling of the lidding member away from the base member, an adhered portion of the first layer aligned with the channel may be configured to be peeled away with the second layer while an independently peelable portion of the first layer aligned with the compartment may be configured to separate from the second layer and remain attached to the inner flange of the sealing surface of the base member to maintain the compartment in a sealed configuration. The independently peelable portion of the first layer may be configured to be peeled away from the inner flange of the sealing surface of the base member independently of the adhered portion of the first layer to provide access to the compartment subsequent to peeling away of the second layer, and the lidding member may be configured to be re-sealable to at least the outer flange of the sealing surface of the base member via the PSA in the perimeter region of the lidding member to re-close the compartment for storing items therein.

In some cases, the independently peelable portion of the first layer may be heat sealed to the inner flange of the sealing surface of the base member around a perimeter of the compartment. The independently peelable portion of the first layer may be defined by a cut line that extends through the first layer and is disposed proximate an outer edge of the inner flange. The cut line may further define a pull tab of the independently peelable portion of the first layer that is configured to be grippable by a user for peeling away the independently peelable portion from the base member.

The adhered portion of the first layer may be defined by two cut lines that extend through the first layer and are disposed proximate corresponding edges of the channel defined by the sealing surface of the base member. The adhesive layer may comprise an area void of adhesive between the second layer and the independently peelable portion of the first layer. Additionally or alternatively, the adhesive layer may comprise an area of permanent adhesive between the second layer and the adhered portion of the first layer.

In some cases, the independently peelable portion may comprise a visual indication of a sealed state of the compartment, such that, upon removal of the independently peelable portion from the base member, the visual indication of the sealed state of the compartment is removed.

In still other embodiments, a method of manufacturing a package is provided. According to embodiments of the method, a base member having a compartment is formed, the base member comprising a sealing surface. A lidding member configured to cover the compartment is also formed by laminating a first layer to a second layer via an adhesive layer, where the adhesive layer comprises at least a pressure sensitive adhesive (PSA) in a perimeter region of the lidding member. A cut line is created through the first layer such that the cut line defines an adhered portion of the first layer configured to be peeled away with the second layer and an independently peelable portion of the first layer configured to separate from the second layer and remain attached to the sealing surface of the base member to maintain the compartment in a sealed configuration. The lidding member may be heat sealed to the base member at a location corresponding to the perimeter region, such that the lidding member covers the compartment and maintains the item within the base member. The independently peelable portion of the first layer may be configured to be peeled away from the sealing surface of the base member independently of the adhered portion of the first layer to provide access to the compartment subsequent to peeling away of the second layer, and the lidding member may be configured to be re-sealable to the sealing surface of the base member via the PSA in the perimeter region of the lidding member to re-close the compartment for storing items therein.

In some cases, forming the base member may comprise forming a base member further having first and second compartments, wherein the lidding member is configured to cover the first and second compartments. In such cases, the adhered portion of the first layer may be aligned with the first compartment and may be configured to be peeled away with the second layer to provide access to the first compartment, while the independently peelable portion of the first layer may be aligned with the second compartment and may be configured to separate from the second layer and remain attached to the sealing surface of the base member around the second compartment to maintain the second compartment in a sealed configuration.

In other embodiments, forming the base member may comprise defining an inner flange and an outer flange of the sealing surface by defining a channel in the sealing surface between the inner and outer flanges. In such cases, the adhered portion of the first layer may be aligned with the channel and may be configured to be peeled away with the second layer, while the independently peelable portion of the first layer may be aligned with the compartment and may be configured to separate from the second layer and remain attached to the inner flange of the sealing surface of the base member to maintain the compartment in a sealed configuration. The method in such cases may further comprise heat sealing the independently peelable portion of the first layer to the inner flange of the sealing surface of the base member around a perimeter of the compartment.

In still other cases, the method may further comprise applying a visual indication of a sealed state of the compartment on the independently peelable portion, such that, upon removal of the independently peelable portion from the base member, the visual indication of the sealed state of the compartment is removed.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

Figure 1A:
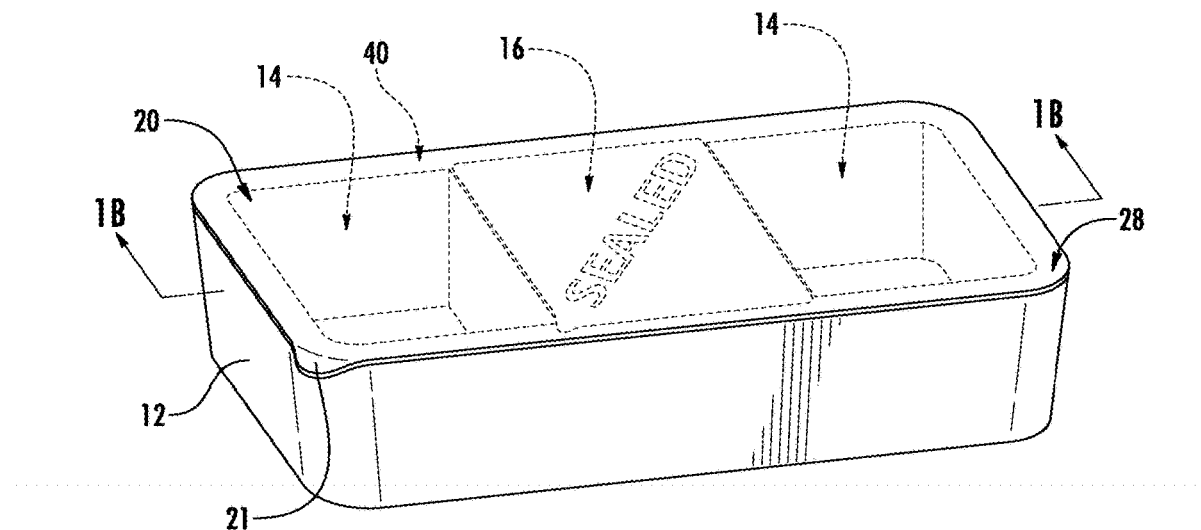
FIG. 1A is a perspective view of a multiple-compartment package with a base member and a lidding member in the closed position according to an example embodiment.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As noted above, some types of items that are sold in packages are meant to be or are commonly used with other items conventionally sold in separate packages. With respect to food items, for example, one type of food may be paired for consumption with another type of food. Examples may include chips and salsa, or pita and hummus.

Although such items (food or non-food) may be commonly used or consumed together, as a pair, the paired items may have different characteristics, such that storage in the same conventional package may cause one or both items to deteriorate or lose consumer appeal. For example, because chips are dry, salty food items, one would not typically store chips in the same package as salsa because the moisture of the salsa may affect the freshness, texture, and taste of the chips (and vice versa).

In addition, a consumer of food and non-food items often appreciates having some indication that the contents of the package he or she is about to purchase has not been tampered with by a previous consumer or person handling the package.

Moreover, consumers often do not consume the entire contents of a package at one time. For example, a container of salsa may be opened to be consumed with chips, but the consumer may only consume a quarter of jar in one sitting. Thus, resealability of the packages in such cases may be helpful for storing any remaining contents of a partially used package of goods.

Through ingenuity and hard work, the inventor has thus developed single- and multiple-compartment packages that provide a single lidding member with multiple layers that are configured to allow the package to be opened in stages.

With respect to embodiments of the package having multiple compartments, for example, as described in greater detail below, the user can access one or more of the compartments by peeling back the lidding member; however, a layer of the lidding member will maintain at least one of the compartments in an unopened condition until the user independently peels that layer off to access the items in that compartment. In some cases, the second layer to be removed may include a visual indication of a sealed condition of the compartment, such that by removing that second layer, the indication of being sealed will also be removed, providing the consumer with a visual indication that the respective compartment was previously accessed. At the same time, the lidding member may be used to reseal all of the compartments via pressure sensitive adhesive (PSA). Embodiments of a multiple-compartment package are illustrated in FIGS. 1A-4B and are described in greater detail below.

With respect to embodiments of the package having a single compartment for the storage of goods, as also described in greater detail below, the user can initially open the package by peeling back the lidding member. In this case, a layer of the lidding member having a visual indication of a sealed condition of the compartment will maintain the compartment in an unopened condition until the user independently peels that layer off to access the items therein. In removing that layer, the indication of being sealed will also be removed, providing the consumer with a visual indication that the compartment was previously accessed. Again, the lidding member may be used to reseal the compartment via pressure sensitive adhesive (PSA). Embodiments of a single-compartment package are illustrated in FIGS. 5A-8B and are described in greater detail below.

Referring now to FIGS. 1A-4B, a multiple-compartment package 10 is shown in accordance with embodiments of the present invention. With reference to FIGS. 1A and 1B, for example, the package 10 includes a base member 12 that defines two first compartments 14 and a second compartment 16. In some embodiments, however, the base member 12 may include a total of two compartments (one first compartment 14 and one second compartment 16), whereas in other embodiments the base member may include four or more total compartments (one or more being first compartments 14 and one or more being second compartments 16), depending on the type of products held therein and other practical, marketing, and/or manufacturing considerations. Each compartment may be configured to hold an item. Using food items as an example, one of the first compartments 14 may hold one flavor of chips; the second compartment 16 may hold a cheese dip; and the other first compartment 14 may hold another flavor of chips. The food items are not shown in the figures for the sake of clarity. Moreover, it is understood that although the example of chips and dip is used to explain embodiments of the present invention, the base member 12 may be configured to hold a variety of food items as well as non-food items.

The package 10 further includes a lidding member 20 that is configured to cover the first and second compartments 14, 16. The lidding member 20 may comprise a first layer 22 and a second layer 24 that is laminated to the first layer via an adhesive layer 26. The adhesive layer 26 may include at least a pressure sensitive adhesive (PSA) in a perimeter region 28 of the lidding member 20.

Figure 1B:
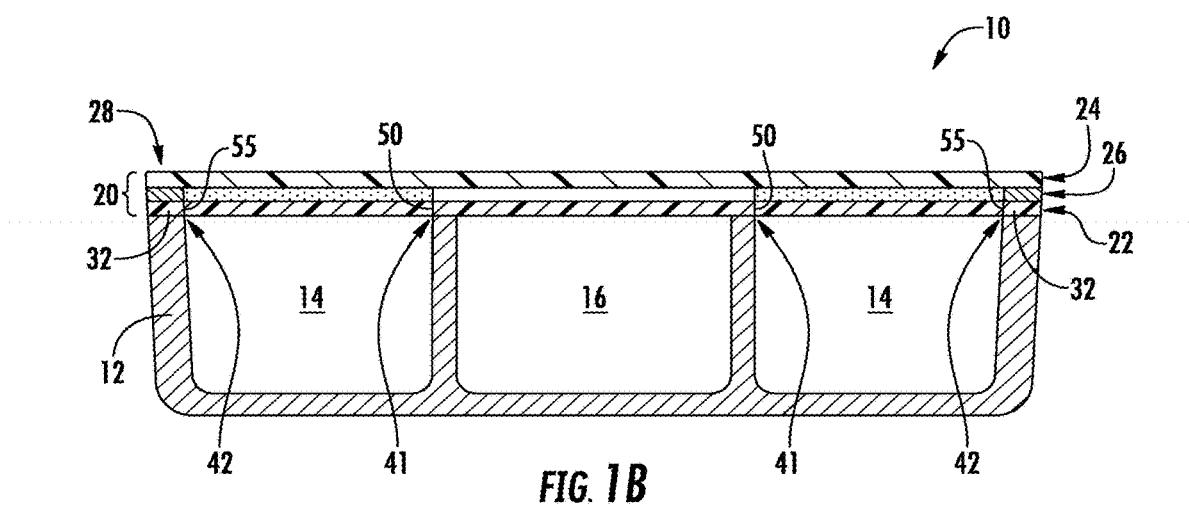
FIG. 1B is a cross-sectional view of the multiple-compartment package of FIG. 1A according to an example embodiment.

In FIGS. 1A and 1B, the package 10 is shown in an initially sealed state, in which the lidding member 20 has not yet been peeled away from the base member 12. As a result, the first and second layers 22, 24 are laminated to each other via the adhesive layer 26 as described above, and the lidding member 20 is secured to the base member 12. For example, in some embodiments, the lidding member 20 may be heat sealed to the base member 12, such as in a location corresponding to the perimeter region 28.

Figure 2A:
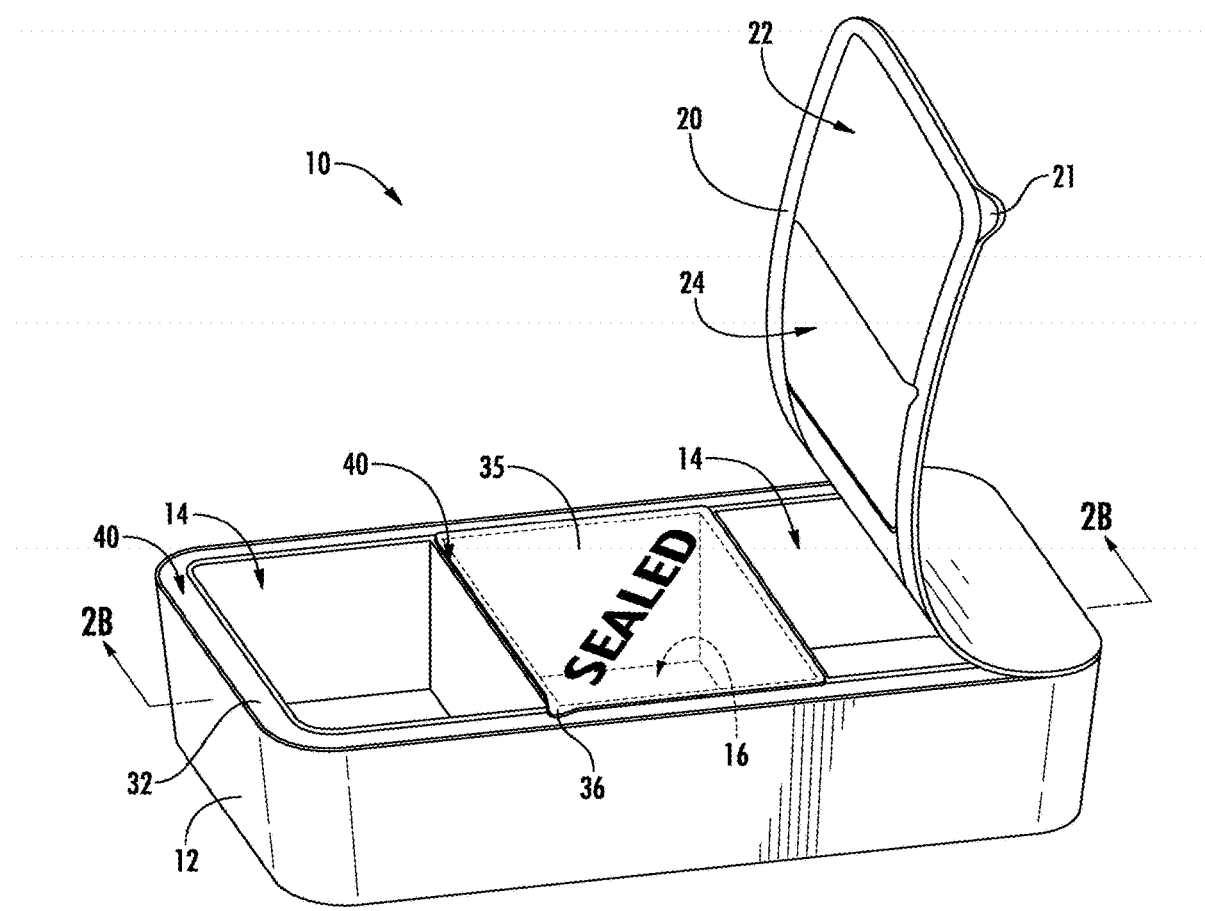
FIG. 2A is a perspective view of a multiple-compartment package with the lidding member peeled away from the base member according to an example embodiment.
Figure 2B:
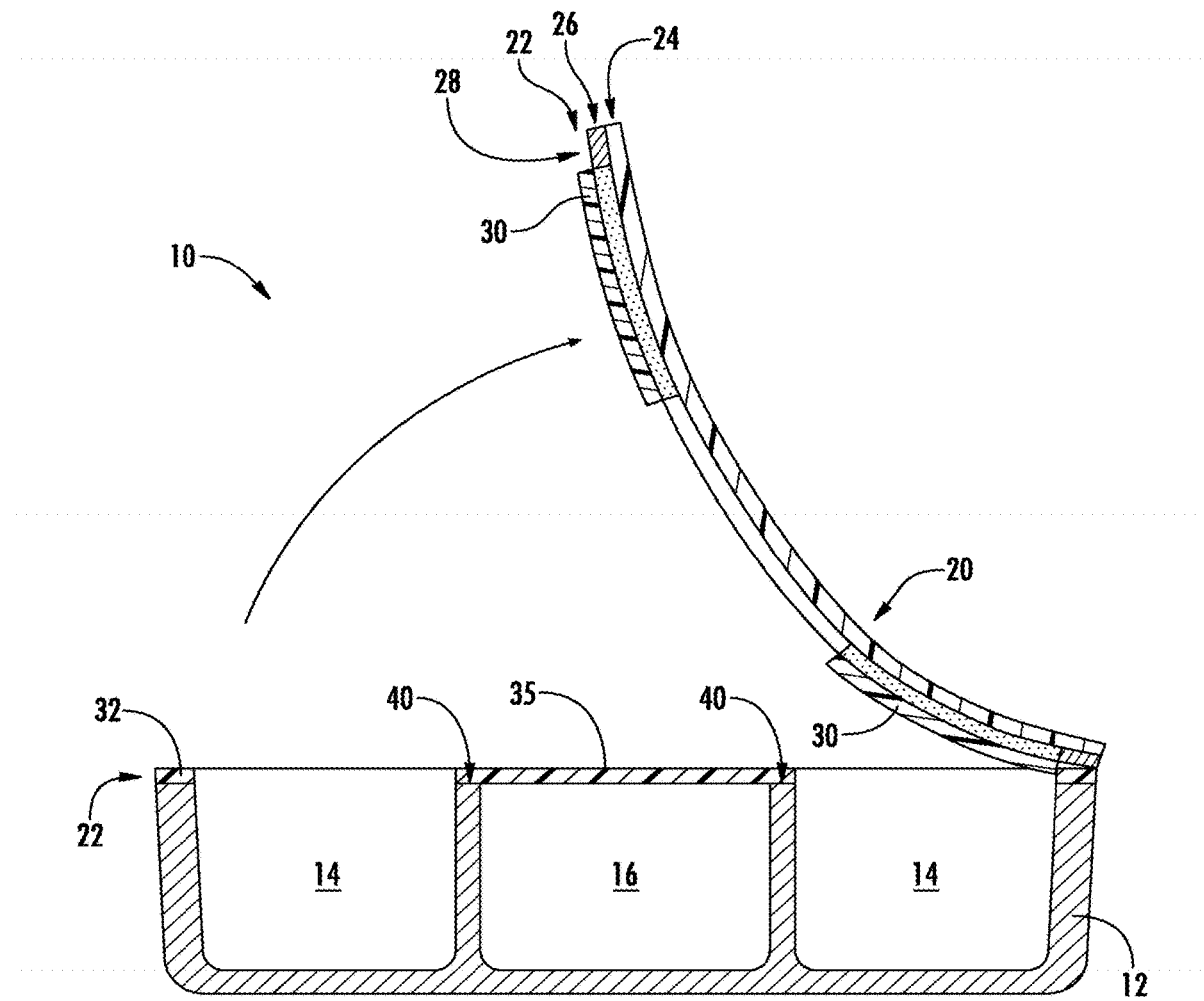
FIG. 2B is a cross-sectional view of the multiple-compartment package of FIG. 2A according to an example embodiment.

FIGS. 2A and 2B show the package 10 in a partially open state, where the user has, for example, gripped a pull tab 21 of the lidding member 20 and proceeded to lift the lidding member 20 away from the base member 12. Upon initial peeling of the lidding member 20 away from the base member 12, an adhered portion 30 of the first layer 22 aligned with the first compartment 14 is peeled away with the second layer 24 (e.g., it remains attached to the second layer via the adhesive layer 26), such that the first compartment 14 is opened and the user can access the items held in the first compartment. At the same time, an independently peelable portion 35 of the first layer 22 aligned with the second compartment 16 is separated from the second layer 24 and remains attached to a sealing surface 40 of the base member 12 around the second compartment 16 to maintain the second compartment in a sealed configuration.

In this regard, the sealing surface 40 of the base member 12 may be a surface that extends at least partially around each of the first and second compartments 14, 16, such that the lidding member 20 may be placed in contact with the sealing surface and heat sealed to secure the lidding member to the base member. In some embodiments, as shown in FIGS. 1A-4B, the sealing surface 40 may be the thickness of a sidewall of the base member 12. In other embodiments, however, the sealing surface 40 may be a flange extending from the sidewall perpendicularly inward with respect to the respective compartment and/or perpendicularly outward with respect to the respective compartment, similar to the configuration of the embodiment of FIGS. 5A-8B, described below.

Figure 3A:
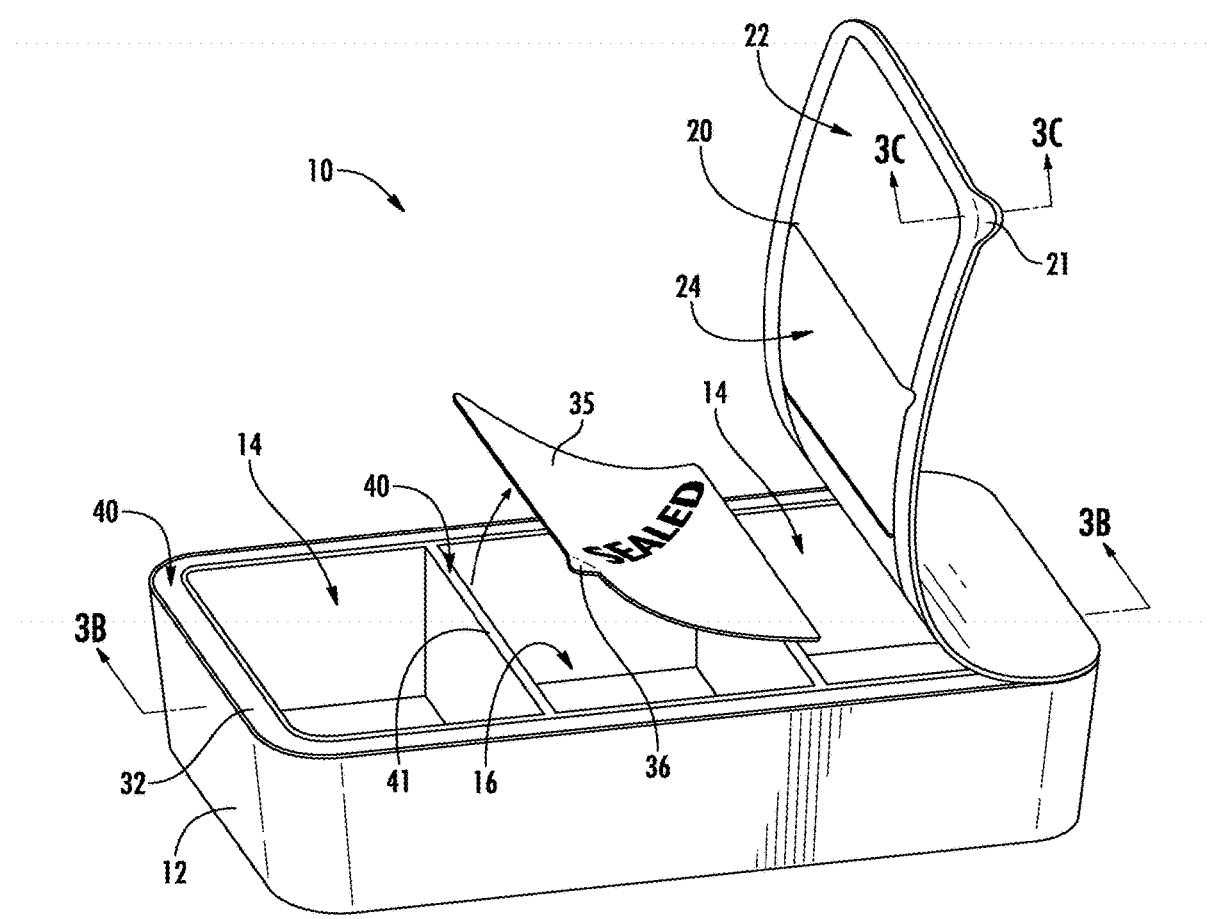
FIG. 3A is a perspective view of a multiple-compartment package with an independently peelable portion of the lidding member peeled away from the base member according to an example embodiment.
Figure 3B:
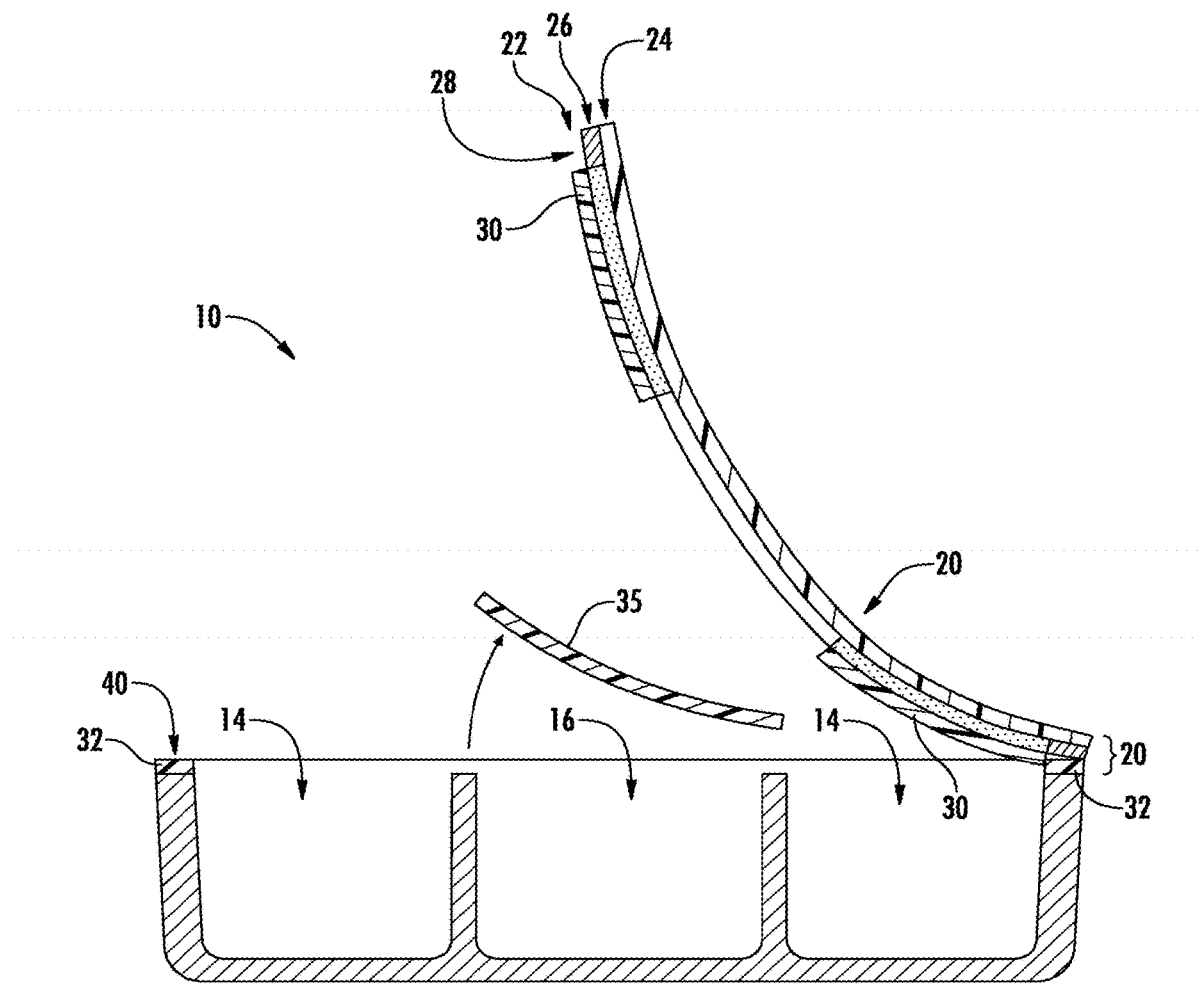
FIG. 3B is a cross-sectional view of the multiple-compartment package of FIG. 3A according to an example embodiment.
Figure 3C:
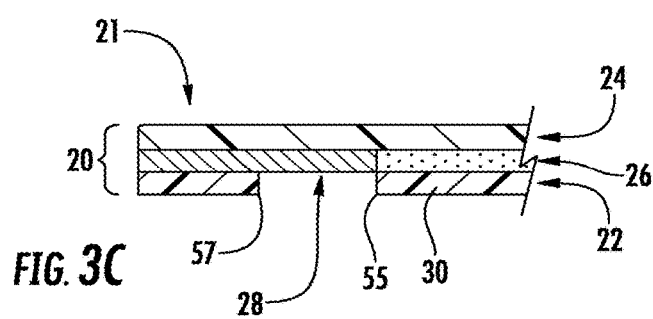
FIG. 3C is another cross-sectional view of the multiple-compartment package of FIG. 3A, through the pull tab, according to an example embodiment.

Accordingly, once the lidding member 20 has been initially peeled away from the base member 12 as shown in FIGS. 2A and 2B, the user can have access to contents stored in the first compartment 14; however, the second compartment 16 remains in a sealed configuration until the independently peelable portion 35 is removed. Turning to FIGS. 3A and 3B, the independently peelable portion 35 of the first layer 22 may thus be configured to be peeled away from the base member 12 independently of the adhered portion 30 of the first layer to provide access to the second compartment 16 subsequent to peeling away of the second layer 24 (e.g., by peeling off the lidding member 20 as described above).

For example, the independently peelable portion 35 of the first layer 22 may be defined by a cut line 50 that extends through the first layer (shown in FIG. 1B). With respect to this and other embodiments described herein, as used herein, the term cut line refers to a cut line that may be a cut that is mechanically formed (e.g., a die cut made by a blade), made by a laser (such as a laser score line), or made in any other suitable manner. In some embodiment, such as the embodiments described herein, the cut line may be a rear cut line (e.g., a cut line that is formed on one side of the lidding member 20 only, such as the side that is later attached to the base member 12). By forming a cut line in this manner (e.g., on the first layer side of the lidding member), one or more barrier films may be used as the second layer 24, where such barrier films would remain intact and untouched by the rear cut lines, thereby increasing the structural integrity of the package.

The independently peelable portion 35 of the first layer 22 (e.g., an edge of the independently peelable portion) may further be heat sealed to the sealing surface 40 of the base member 12 around a perimeter of the second compartment 16. The cut line 50 may, in some embodiments, be disposed proximate (e.g., as close to as practically possible) an outer edge 41 of the sealing surface 40 of the second compartment, such that the inertia of the user's pulling up on the lidding member 20 as shown in FIG. 2A, coupled with the seal force between the sealing surface 40 around the second compartment 16 and the corresponding edge region of independently peelable portion 35, causes the independently peelable portion 35 to delaminate from the second layer 24 of the lidding member 20 and remain sealed to the base member 12. Moreover, in some cases, the cut line 50 defining the independently peelable portion 35 may further define a pull tab 36 of the independently peelable portion of the first layer 22, as shown in FIG. 3A. The pull tab 36 may be configured to be grippable by the user for peeling away the independently peelable portion 35 from the base member 12.

Similarly, the adhered portion 30 of the first layer 22 may be defined by a cut line 55 that extends through the first layer, as shown in FIG. 1B. The cut line 55 may be disposed proximate (e.g., as close to as practically possible) an inner edge 42 of the sealing surface 40 of the first compartment(s) 14, and in some cases the cut line 55 may at least partially overlap or be part of the cut line 50 defining the independently peelable portion 35. In this way, the inertia of the user's pulling up on the lidding member 20 as shown in FIG. 2A may cause the adhered portion 30 to remain laminated to the second layer 24 of the lidding member 20, thereby uncovering the first compartment 14.

Figure 4A:
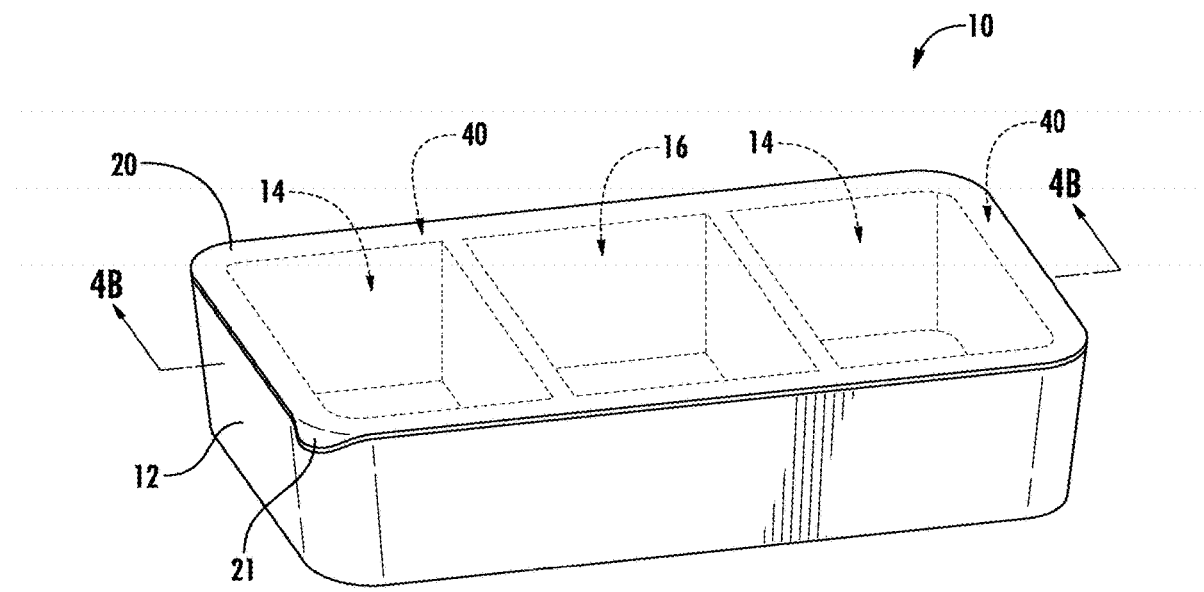
FIG. 4A is a perspective view of a multiple-compartment package with the lidding member re-sealed to the base member after the independently peelable portion has been removed according to an example embodiment.
Figure 4B:
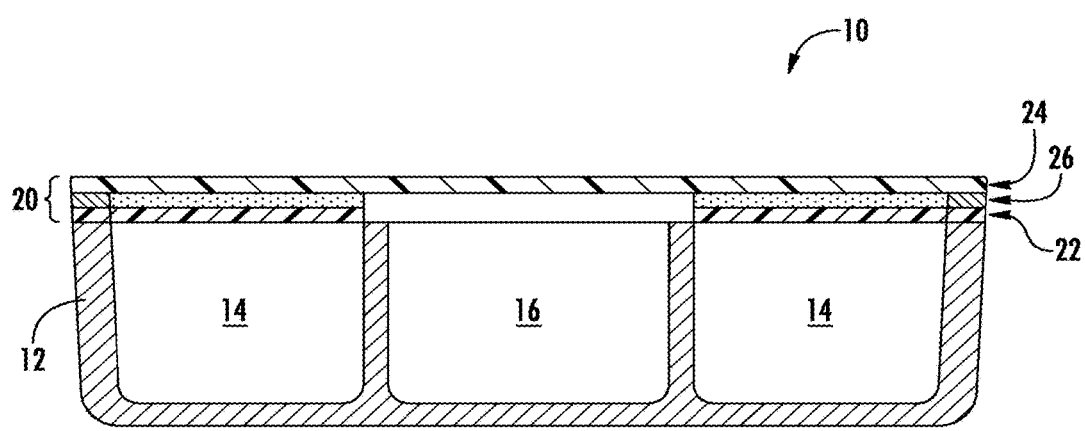
FIG. 4B is a cross-sectional view of the multiple-compartment package of FIG. 4A according to an example embodiment.

The lidding member 20 may be configured to be re-sealable to the base member 12 via the PSA in the perimeter region 28 of the lidding member to re-close both the first and the second compartments 14, 16 for storing items therein, as shown in FIGS. 4A and 4B. In some embodiments, for example, the PSA may serve to re-seal the lidding member 20 to the sealing surface 40 of the base member 12 along the perimeter region 28, thereby covering all of the compartments 14, 16 at the same time. In other embodiments, such as where a pull tab 21 of the lidding member 20 is provided with an undercut 57 (shown in FIG. 3C) through the first layer 22, a residual portion 32 of the first layer 22 that is heat sealed to the sealing surface 40 of the base member 12 may remain adhered to the base member, as best shown in FIG. 2B. In such cases, the residual portion 32, by virtue of the undercut 57 defining the pull tab 21, may delaminate from the second layer 24 and remain with the sealing surface 40 of the base member 12. As the user continues peeling the lidding member 20, the cut line 55 defining the adhered portion, shown in FIG. 1B, may cause the adhered portion 30 to lift up with the second layer 24 and remain with the lidding member, thereby uncovering the first compartment 14. When the peeling reaches the second compartment 16, shown in FIG. 2A, for example, the independently peelable portion 35 may remain heat sealed to the base member 12 as described above, thereby maintaining the second compartment 16 in a sealed condition. In the depicted embodiment, where another first compartment 14 is shown, the cut line 50 may cause the respective adhered portion 30 to remain with the lidding member 20 as it continues to be peeled, thereby opening the respective other first compartment 14.

In some cases, the package 10 may be configured so as to keep the lidding member 20 attached to the package at one edge or a portion of an edge, so as to facilitate re-alignment of the lidding member with the sealing surface 40 when the lidding member 20 is used to re-seal the package (e.g., after the independently peelable portion 35 is removed). For example, the cut line 55 formed in the first layer 22 that allows the lidding member 20 to be peeled back may, at an end of the package 10 opposite the pull tab 21, for example, be discontinuous (e.g., not define a closed shape of the respective adhered portion 30 so as to prevent or at least make it more difficult to completely remove the lidding member 20 as the lidding member is peeled back. In some cases, for example, the cut line 55 may comprise free ends at the end of the package 10 where the lidding member 20 is to remain attached, and the free ends may define "J"-hooks (e.g., may be curved outwardly, towards an outer edge of the package).

In some embodiments, the adhesion of the adhered portion(s) 30 and the delamination of the independently peelable portion(s) 35 may be facilitated through the use of different types of adhesives in the adhesive layer 26 (FIG. 1B). For example, in some embodiments, the adhesive layer 26 may entirely or nearly entirely consist of PSA (e.g., by flood coating with PSA) and the independently peelable portion 35 may remain attached to the base member 12 because the force of the heat seal on the independently peelable portion is stronger than the adhesive force of the PSA. In other cases, however, the adhesive layer 26 may comprise an area void of adhesive between the second layer 24 and the independently peelable portion 35 of the first layer 22. In this way, because there is no adhesive in the area bounded by the cut line 50 defining the independently peelable portion 35, for example, the independently peelable portion 35 may encounter no adhesive forces keeping that portion with the rest of the lidding member 20. The PSA in such cases may be pattern printed on the respective surface of the first layer 22 and/or the second layer 24.

Similarly, in contrast with embodiments in which the adhesive layer 26 comprises flood-coated PSA, including in between the second layer 24 and the adhered portion 30 of the first layer 22, in other cases the adhesive layer may comprise an area of permanent adhesive between the second layer and the adhered portion of the first layer. Because the permanent adhesive has a stronger adhesive force than the surrounding PSA and/or areas void of adhesive, the adhered portion 30 of the first layer 22 may be urged to remain with the lidding member 20 as the user peels the lidding member off the base member 12. Permanent adhesive may also be used in the area of the pull tab 21 in some embodiments to maintain the first layer 22 with the second layer 24. In such embodiments, the PSA and permanent adhesive may be pattern printed onto the respective surface of the first layer 22 and/or the second layer 24.

In some embodiments, the independently peelable portion 35 may comprise a visual indication of a sealed state of the second compartment 16, such that, upon removal of the independently peelable portion from the base member 12, the visual indication of the sealed state of the second compartment is removed. For example, the visual indication may be a printed indicia, such as a word or an image that indicates the sealed state of the second compartment 16. In the depicted embodiment as shown in FIGS. 1A, 2A, and 3A, for example, the word "SEALED" is printed on a surface of the first layer in a location corresponding to the independently peelable portion 35. The second layer 24, for example, may be made of a transparent material, such that the visual indication (e.g., the word "SEALED") on the independently peelable portion 35 can be seen through the second layer by the user, before the lidding member 20 is peeled away. In this way, the user knows that the independently peelable portion 35 is in place and the corresponding second compartment 16 has not yet been opened (see FIGS. 1A and 1B). After the lidding member 20 has been lifted up by the user (FIGS. 2A and 2B), the user may remove the independently peelable portion 35 as described above (FIGS. 3A and 3B). In so doing, the visual indication (e.g., the word "SEALED") is also removed, and if the user chooses to re-seal the compartments 14, 16 by adhering the lidding member 20 back onto the sealing surface 40 of the base member 12 (e.g., via the PSA), as shown in FIGS. 4A and 4B, the visual indication will no longer be visible to the user, and the user will know that the corresponding second compartment 16 has been opened and is no longer "sealed." In this way, the visual indication may serve as a form of tamper evidence to the user, its presence indicating a sealed (untampered) state of the second compartment 16 and its absence indicating an unsealed state of the second compartment.

Turning now to FIGS. 5A-8B, a single-compartment embodiment of the present invention is shown. Similar to the multiple-compartment embodiment described above, FIGS. 5A-8B depict a package 100 comprising a base member 112 defining a compartment 114 and also comprising a lidding member 120 configured to cover the compartment. The base member 112 may comprise a sealing surface 140 configured to be sealed to the lidding member 120. The sealing surface 140 may, for example, be formed by an inner flange 162 and an outer flange 164, as shown in FIG. 5B. Moreover, the sealing surface 140 may define a channel 166 between the inner flange 162 and the outer flange 164. In this regard, working from the compartment 114 outward would be the inner flange 162 most proximate the compartment, then the channel 166, then the outer flange 164 on the other side of the channel from the inner flange. The outer flange 164 may thus define an exterior edge 168, where the exterior edge of the outer flange also serves as the outermost edge of the base member 112, as depicted. The lidding member 120 may comprise a first layer 122 and a second layer 124 laminated to the first layer via an adhesive layer 126, wherein the adhesive layer comprises at least a pressure sensitive adhesive (PSA) in a perimeter region 128 of the lidding member, aligned with the outer flange 164 of the sealing surface 140 of the base member 112.

In some embodiments, the lidding member 120 may define a pull tab 121 extending outwardly from the exterior edge 168 of the outer flange 164. The pull tab 121 may thus be configured to be grippable by a user for peeling away the lidding member 120 from the base member 112.

Figure 6A:
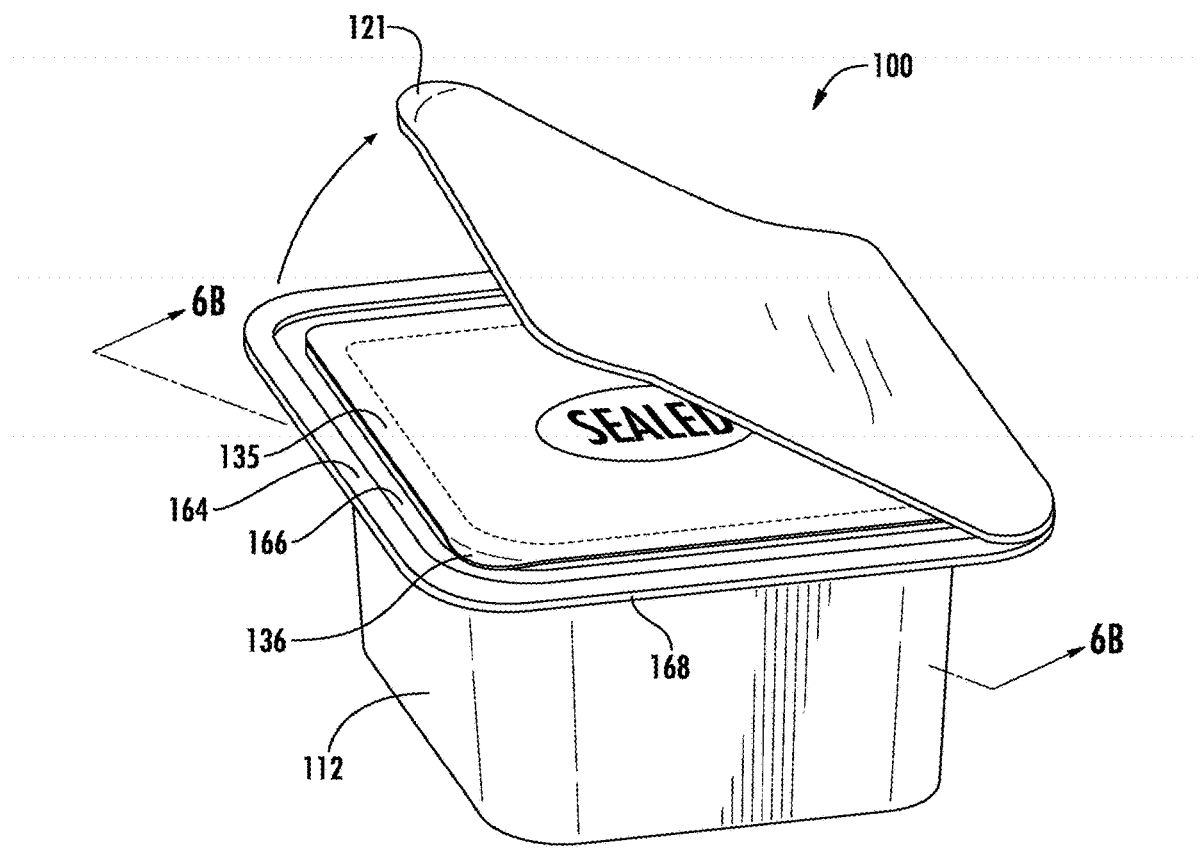
FIG. 6A is a perspective view of a single-compartment package with the lidding member peeled away from the base member according to an example embodiment.
Figure 6B:
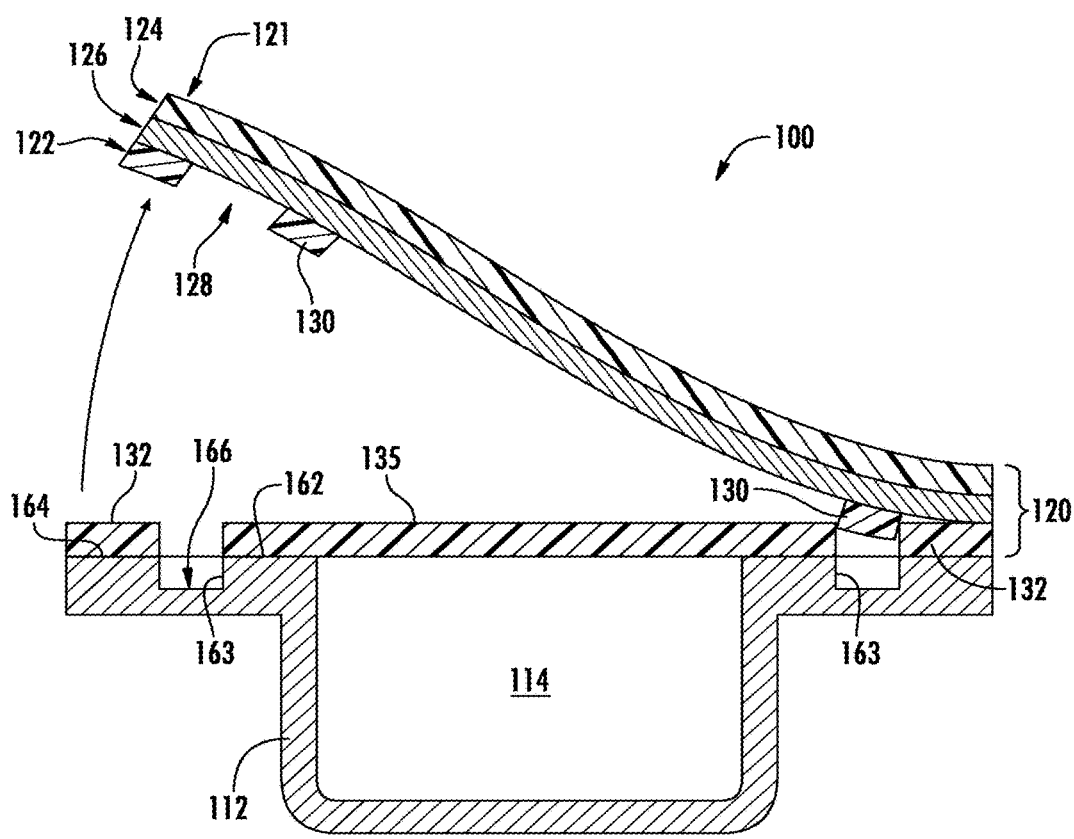
FIG. 6B is a cross-sectional view of the single-compartment package of FIG. 6A according to an example embodiment.

Upon initial peeling of the lidding member 120 away from the base member 112 by a user, such as via the pull tab 121 in the depicted embodiment, an adhered portion 130 of the first layer 122 aligned with the channel 166 may be configured to be peeled away with the second layer 124, as shown in FIGS. 6A and 6B. At the same time, an independently peelable portion 135 of the first layer 122 aligned with the compartment 114 may be configured to separate from the second layer 124 and remain attached to the inner flange 162 of the sealing surface 140 of the base member 112 to maintain the compartment 114 in a sealed configuration. For example, in some embodiments, the independently peelable portion 135 of the first layer 122 may be heat sealed to the inner flange 162 of the sealing surface 140 of the base member 112 around a perimeter of the compartment 114.

Figure 5A:
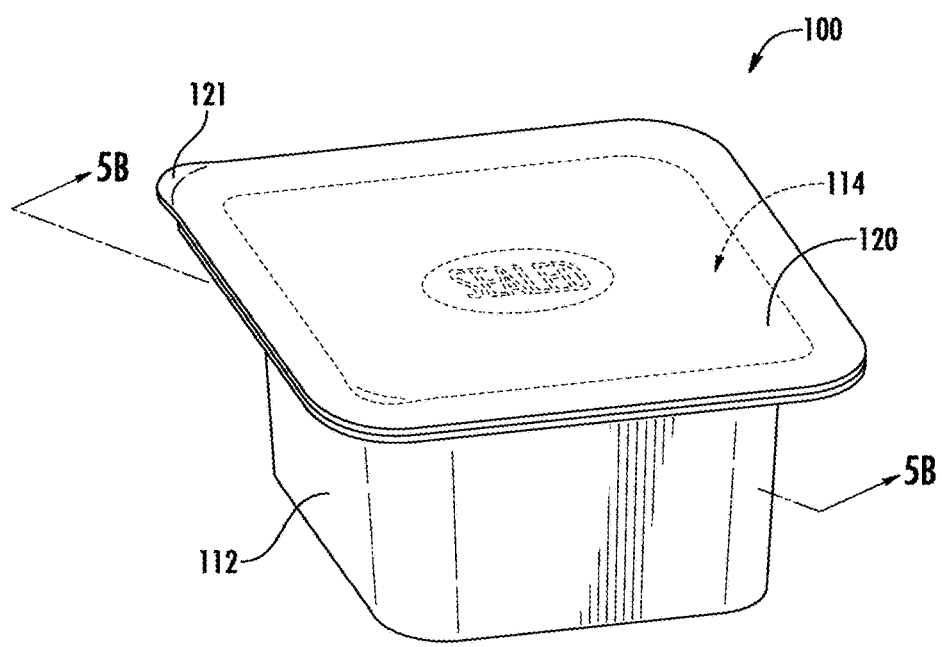
FIG. 5A is a perspective view of a single-compartment package with a base member and a lidding member in the closed position according to an example embodiment.
Figure 5B:
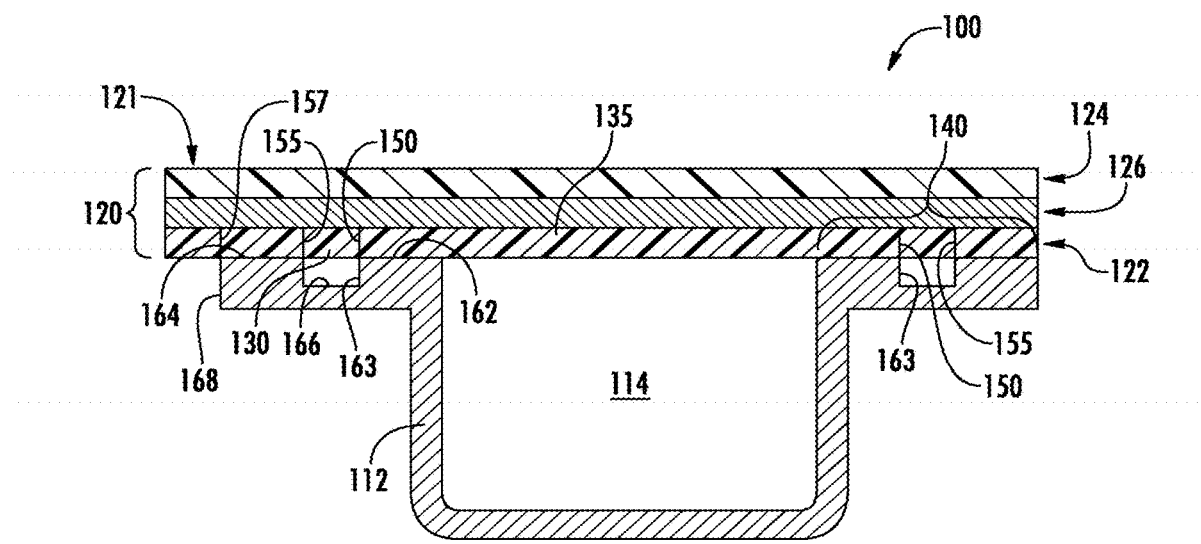
FIG. 5B is a cross-sectional view of the single-compartment package of FIG. 5A according to an example embodiment.
Figure 7A:
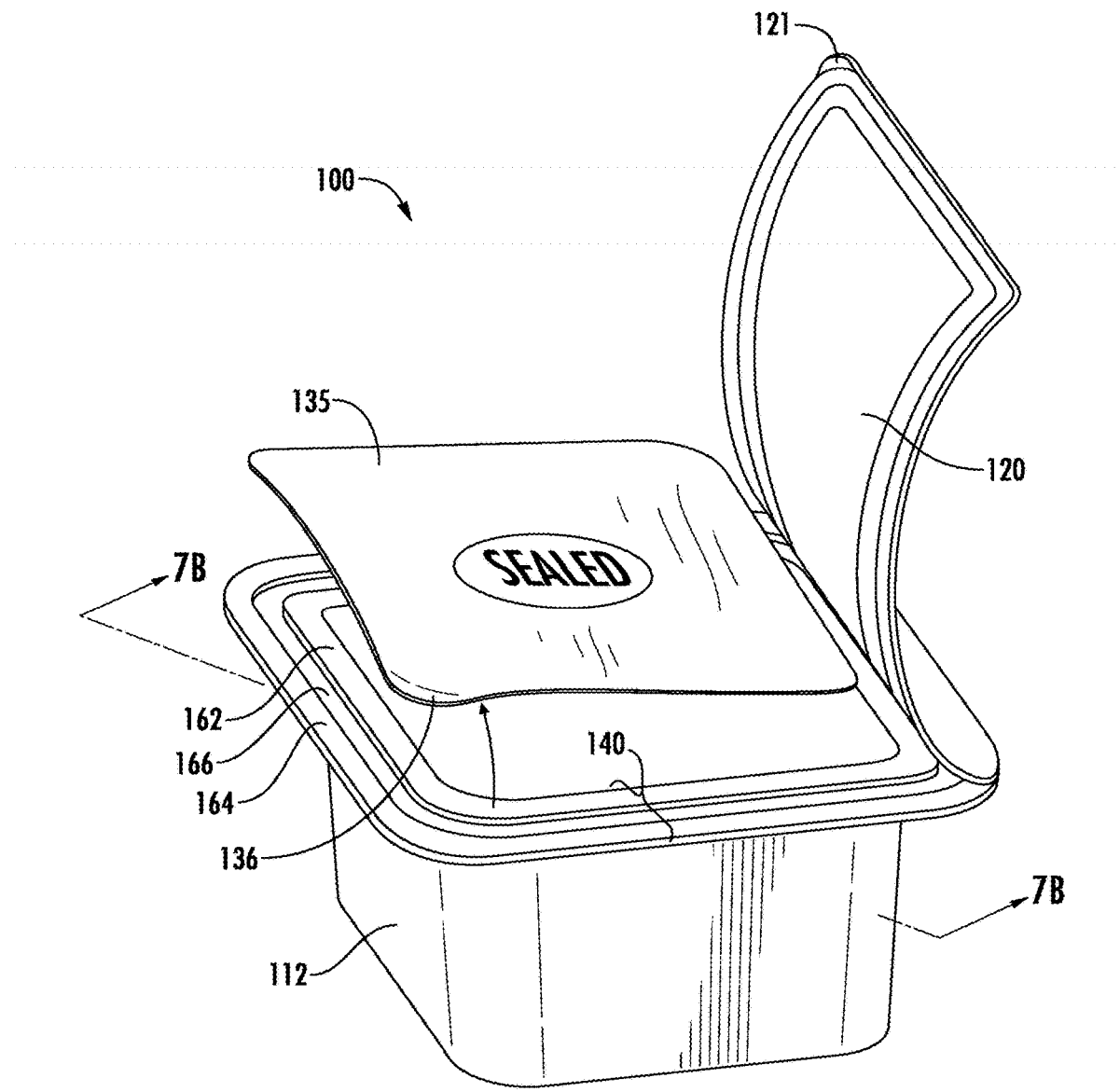
FIG. 7A is a perspective view of a single-compartment package with an independently peelable portion of the lidding member peeled away from the base member according to an example embodiment.
Figure 7B:
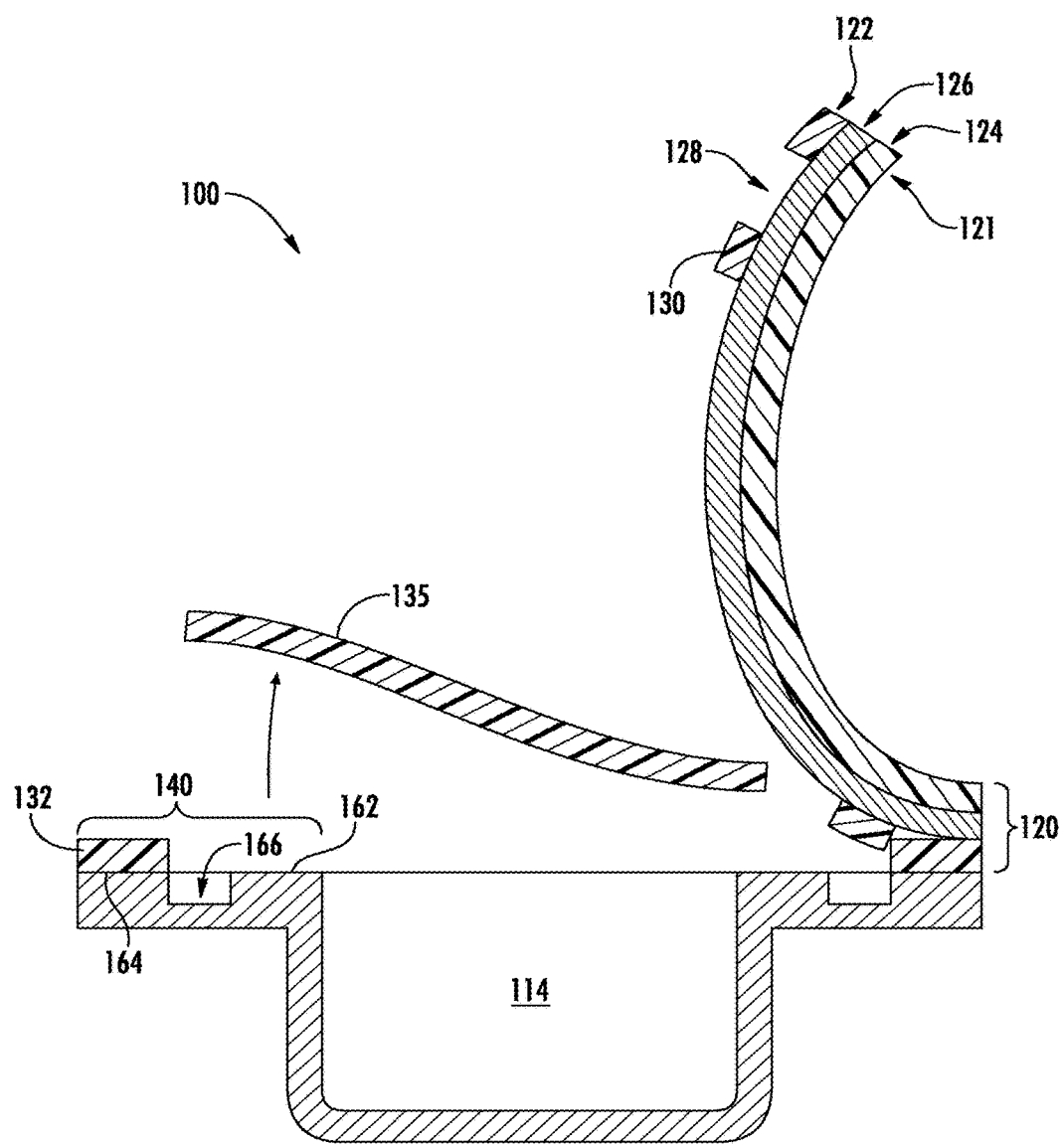
FIG. 7B is a cross-sectional view of the single-compartment package of FIG. 7A according to an example embodiment.

In this regard, the independently peelable portion 135 of the first layer 122 may be configured to be peeled away from the inner flange 162 of the sealing surface 140 of the base member 112 independently of the adhered portion 130 of the first layer 122 to provide access to the compartment subsequent to peeling away of the second layer 124, as shown in FIGS. 7A and 7B. The independently peelable portion 135 of the first layer 122 may, in some embodiments, be defined by a cut line 150 that extends through the first layer 122 and is disposed proximate (as close to as practically possible) an outer edge 163 of the inner flange 162, as shown in FIGS. 5B and 6B. The cut line 150 defining the independently peelable portion 135 may, in some embodiments, further define a pull tab 136 of the independently peelable portion, as shown in FIGS. 6A and 7A. The pull tab 136 may be configured to be grippable by a user for peeling away the independently peelable portion 135 from the base member 112, as described above with respect to other embodiments.

The adhered portion 130, in turn, may be defined by two cut lines that extend through the first layer 122 and are disposed proximate corresponding edges of the channel 166 defined by the sealing surface 140 of the base member 112. For example, with reference to FIG. 5B, the cut line 150 defining the independently peelable portion 135 may define an innermost edge of the adhered portion 130 (e.g., the edge closest to the compartment 114) and may be disposed as close as possible (given engineering and manufacturing tolerances) to the corresponding innermost edge of the channel 166. A cut line 155 may likewise define an outermost edge of the adhered portion 130 (e.g., the edge closest to the compartment 114) and may be disposed as close as possible to the corresponding outermost edge of the channel 166. As described above with respect to the multiple-compartment embodiment of FIGS. 1A-4B, the provision of cut lines 150, 155 and their location with respect to the edges formed by the sealing surface 140 may thus serve to facilitate the adhesion of the adhered portion 130 to the second layer 122 of the lidding member 120 and the delamination of the independently peelable portion 135 from the second layer 122 of the lidding member.

Figure 8A:
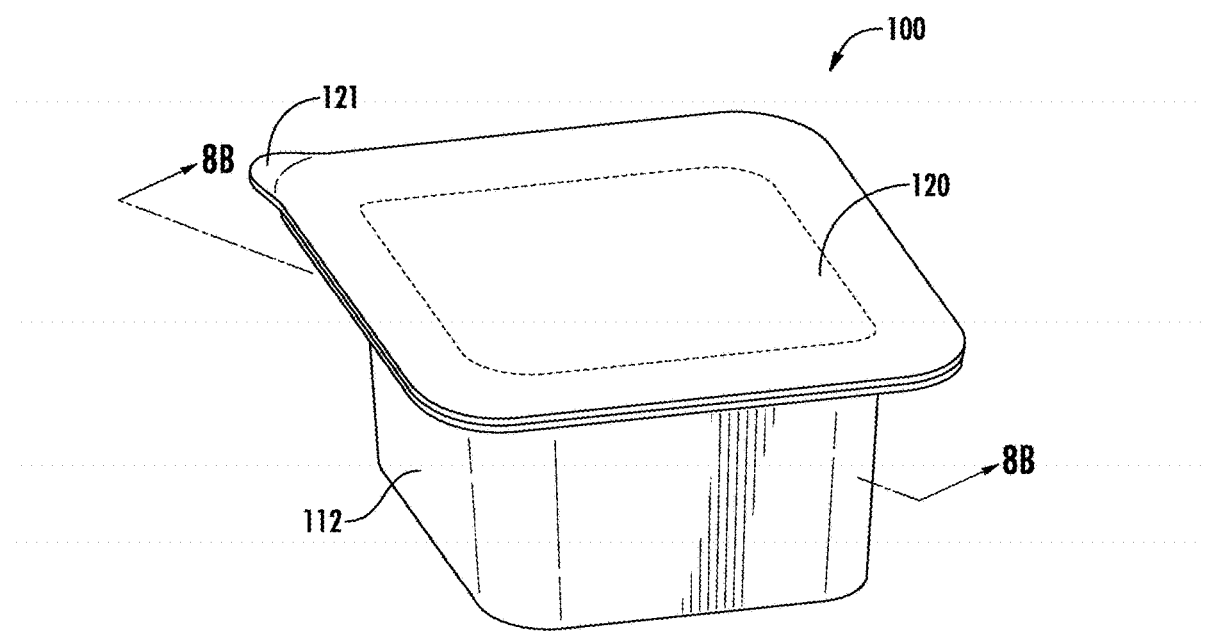
FIG. 8A is a perspective view of a single-compartment package with the lidding member re-sealed to the base member after the independently peelable portion has been removed according to an example embodiment.
Figure 8B:
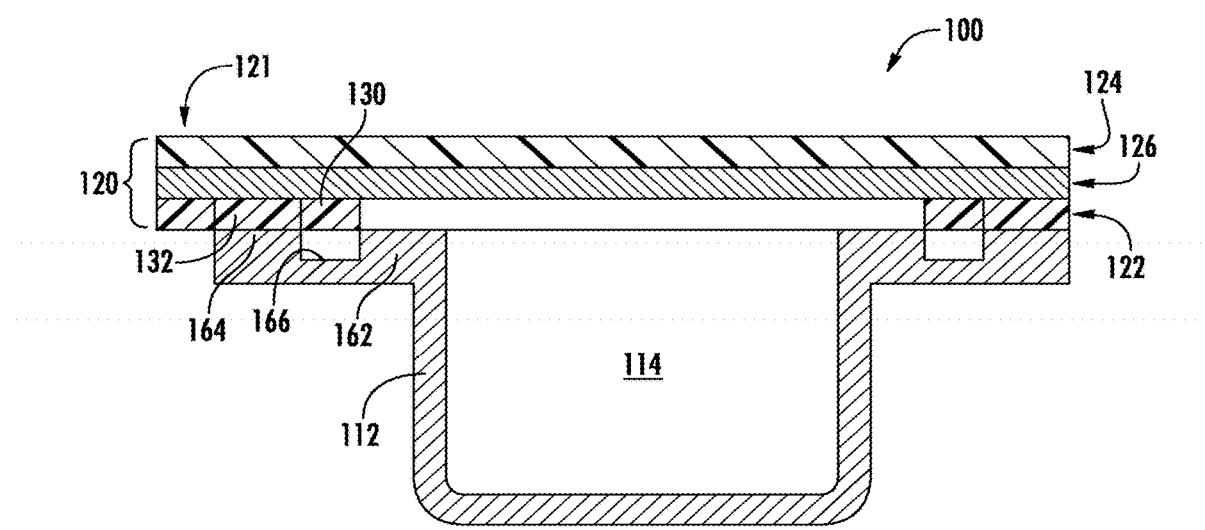
FIG. 8B is a cross-sectional view of the single-compartment package of FIG. 8A according to an example embodiment.

The lidding member 120 may further be configured to be resealable to at least the outer flange 164 of the sealing surface 140 (shown in FIG. 7A and 7B) of the base member 112 via the PSA in the perimeter region 128 of the lidding member to re-close the compartment 114 for storing items therein. The re-closed package is shown in FIGS. 8A and 8B. In some embodiments, as described above with respect to the embodiment of FIGS. 1A-4B, the PSA may serve to re-seal the lidding member 120 to the sealing surface 140 of the base member 112 along the perimeter region 128, thereby re-closing the compartment 114. In other embodiments, such as where a pull tab 121 of the lidding member 120 is provided with an undercut 157 (shown in FIG. 5B) through the first layer 122, a residual portion 132 of the first layer 122 that is heat sealed to the outer flange 164 of the sealing surface 140 of the base member 112 may remain adhered to the base member, as best shown in FIGS. 6B and 7B. In such cases, the residual portion 132, by virtue of the undercut 157 defining the pull tab 121, may delaminate from the second layer 124 and remain with the outer flange 164. As the user continues peeling the lidding member 120, the cut line 155 defining the outermost edge of the adhered portion 130, shown in FIG. 5B, may cause the adhered portion 130 to lift up with the second layer 124 and remain with the lidding member, thereby uncovering the channel 166. As the lidding member 120 is peeled further, the independently peelable portion 135 remains heat sealed to the base member 112 as described above, thereby maintaining the compartment 114 in a sealed condition.

In some embodiments, the adhesion of the adhered portion 130 and the delamination of the independently peelable portion 135 may be facilitated through the use of different types of adhesives in the adhesive layer 126 (FIG. 5B). For example, while in some embodiments the adhesive layer 126 may entirely or nearly entirely consist of PSA (e.g., by flood coating with PSA), as illustrated in the depicted embodiment, in other cases the adhesive layer 126 may comprise an area void of adhesive between the second layer 124 and the independently peelable portion 135 of the first layer 122, as illustrated with respect to the embodiment of FIGS. 1A-4B. In this way, because there is no adhesive in the area bounded by the cut line 150 defining the independently peelable portion 135, for example, the independently peelable portion 135 may encounter no adhesive forces keeping that portion with the rest of the lidding member 120. The PSA in such cases may be pattern printed on the respective surface of the first layer 122 and/or the second layer 124.

Similarly, in contrast with embodiments in which the adhesive layer 126 comprises flood-coated PSA, including in between the second layer 124 and the adhered portion 130 of the first layer 122, in other cases the adhesive layer may comprise an area of permanent adhesive between the second layer and the adhered portion of the first layer (e.g., a strip of permanent adhesive corresponding to the shape of the adhered portion). Because the permanent adhesive has a stronger adhesive force than the surrounding PSA and/or areas void of adhesive, the adhered portion 130 of the first layer 122 may be urged to remain with the lidding member 120 as the user peels the lidding member off the base member 112. Permanent adhesive may also be used in the area of the pull tab 121 in some embodiments to maintain the first layer 122 with the second layer 124. In such embodiments, the PSA and permanent adhesive may be pattern printed onto the respective surface of the first layer 122 and/or the second layer 124.

In some embodiments, the independently peelable portion 135 may comprise a visual indication of a sealed state of the compartment 114, such that, upon removal of the independently peelable portion from the base member 112, the visual indication of the sealed state of the compartment is removed. For example, the visual indication may be a printed indicia, such as a word or an image that indicates the sealed state of the compartment 114. In the depicted embodiment as shown in FIGS. 5A, 6A, and 7A, for example, the word "SEALED" is printed on a surface of the first layer 122 in a location corresponding to the independently peelable portion 135. The second layer 124, for example, may be made of a transparent material, such that the visual indication (e.g., the word "SEALED") on the independently peelable portion 135 can be seen through the second layer by the user, before the lidding member 120 is peeled away. In this way, the user knows that the independently peelable portion 135 is in place and the compartment 114 has not yet been opened (see FIGS. 5A and 5B). After the lidding member 120 has been lifted up by the user (FIGS. 6A and 6B), the user may remove the independently peelable portion 135 as described above (FIGS. 7A and 7B). In so doing, the visual indication (e.g., the word "SEALED") is also removed, and if the user chooses to re-seal the compartment 114 by adhering the lidding member 120 back onto the sealing surface 140 (e.g., the inner flange 162 and/or the outer flange 164) of the base member 112 (e.g., via the PSA), as shown in FIGS. 8A and 8B, the visual indication will no longer be visible to the user, and the user will know that the compartment 114 has been opened and is no longer "sealed." In this way, the visual indication may serve as a form of tamper evidence to the user, its presence indicating a sealed (untampered) state of the compartment 114 and its absence indicating an unsealed state of the compartment.

With respect to the embodiments described above in connection with FIGS. 1A-4B and FIGS. 5A-8B, various types of materials may be selected for forming the base member 12, 112 and the lidding member 20, 120. In some embodiments, for example, the base member 12, 112 may be a thermoformed plastic, such as Acrylonitrile-Butadiene-Styrene (ABS) plastic. In other cases, the base member 12 may be formed of a low density polyethylene (LDPE) material, a high impact polystyrene (HIPS) material, a polyethylene (PE) emulsion, or other compatible material or combinations thereof. The first layer 22, 122 of the lidding member 20, 120 may comprise a material selected to facilitate sealing of the lidding member 20, 120 to the sealing surface 40, 140 of the base member. For example, when the base member comprises polypropylene (PP), the first layer 22, 122 of the lidding member 20, 120 may, in turn, also comprise a form of PP to facilitate sealing of the lidding member to the sealing surface 40, 140 of the base member 12, 112 (e.g., via heat sealing as described above). For example, the lidding member 20, 120 may comprise cast polypropylene (CPP), oriented polypropylene (OPP), or metalized oriented polypropylene (mOPP), among other materials. The second layer 24, 124 may comprise polyethylene terephthalate (PET) or one or more barrier films in some embodiments. In some cases, the second layer 24, 124 may further include a primer. Furthermore, in some embodiments (not shown), an ink layer may be printed on an inner surface of the second layer 24, 124, between the adhesive layer 26, 126 and the second layer. For example, various graphics or high resolution printing techniques may be used, both on the lidding member as a whole (e.g., the second layer 24, 124) and/or on the independently peelable portion 35, 135 to provide the visual indication of the sealed state of the compartment covered by the independently peelable portion.

Embodiments of the present invention may, in some cases, be used in tray and flow-wrap applications, such as when the lidding member 20, 120 is heat sealed to the base member 20, 120 and an outer die cut is created to trim the lidding member to the base member. In one or more of the embodiments described herein, a heat seal die may be used to create a heat seal between the lidding member 20, 120 and the outside perimeter of the package as a whole, as well as a heat seal between the independently peelable portion 35, 135 and the perimeter of the particular compartment covered by the independently peelable portion.

In addition to the different embodiments of packages described above with respect to FIGS. 1A-8B, embodiments of a method of manufacturing a package are also provided. Embodiments of the method include forming a base member having at least one compartment, the base member comprising a sealing surface, and forming a lidding member configured to cover the first compartment by laminating a first layer to a second layer via an adhesive layer, wherein the adhesive layer comprises at least a pressure sensitive adhesive (PSA) in a perimeter region of the lidding member. A cut line may be created through the first layer such that the cut line defines an adhered portion of the first layer configured to be peeled away with the second layer and an independently peelable portion of the first layer configured to separate from the second layer and remain attached to the sealing surface of the base member to maintain the compartment in a sealed configuration. The lidding member may be heat sealed to the base member at a location corresponding to the perimeter region, such that the lidding member covers the compartment and maintains the item within the base member.

The independently peelable portion of the first layer may be configured to be peeled away from the sealing surface of the base member independently of the adhered portion of the first layer to provide access to the compartment subsequent to peeling away of the second layer. Moreover, the lidding member may be configured to be re-sealable to the sealing surface of the base member via the PSA in the perimeter region of the lidding member to re-close the compartment for storing items therein, as described with respect to the embodiments of FIGS. 1A-8B above.

In some embodiments, forming the base member may comprise forming a base member further having first and second compartments (e.g., as shown in FIGS. 1A-4B), and the lidding member may be configured to cover the first and second compartments. The adhered portion of the first layer in such embodiments may be aligned with the first compartment(s) and may be configured to be peeled away with the second layer to provide access to the first compartment(s). The independently peelable portion of the first layer, in turn, may be aligned with the second compartment and may be configured to separate from the second layer and remain attached to the sealing surface of the base member around the second compartment to maintain the second compartment in a sealed configuration.

In other embodiments, such as depicted in and described with respect to FIGS. 5A-8B, forming the base member may comprise defining an inner flange and an outer flange of the sealing surface by defining a channel in the sealing surface between the inner and outer flanges. The adhered portion of the first layer may be aligned with the channel and may be configured to be peeled away with the second layer. The independently peelable portion of the first layer may be aligned with the compartment and may be configured to separate from the second layer and remain attached to the inner flange of the sealing surface of the base member to maintain the compartment in a sealed configuration. The method may further include heat sealing the independently peelable portion of the first layer to the inner flange of the sealing surface of the base member around a perimeter of the compartment.

In still other embodiments, as described above, the method may further comprise applying a visual indication of a sealed state of the respective compartment on the independently peelable portion, such that, upon removal of the independently peelable portion from the base member, the visual indication of the sealed state of the compartment covered by the independently peelable portion is removed.

As noted above, some of the figures described above have been simplified for purposes of explanation, such that not all portions of the components, including portions of the base member, first and second layers of the lidding member, die cuts, adhesive layers, stored items, etc. are shown. It is understood that portions of these components may be configured to impart additional desirable qualities to the package, such as to facilitate opening and closure of the package, re-sealability, barrier properties, etc.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A package comprising:
   a base member having at least two compartments, the base member comprising:
   a sealing surface;
   a lidding member which covers the at least two compartments in a closed configuration, the lidding member comprising a first layer laminated to a second layer via an adhesive layer, wherein the adhesive layer comprises at least a pressure sensitive adhesive (PSA) in a perimeter region of the lidding member, and wherein at least the perimeter region of the lidding member is adhered via the PSA to the sealing surface of the base member in a closed configuration;
   a cut line through the first layer which defines
      a first portion of the first layer which is permanently adhered to the second layer and covers at least a portion of a first compartment of the at least two compartments and
      a second portion of the first layer, wherein the second portion
         is not permanently adhered to the second layer,
         is heat sealed to the sealing surface of the base member, and covers at least a second compartment of the at least two compartments; and
   wherein when the lidding member is peeled away from the sealing surface, the at least one first compartment is opened and the at least one second compartment remains covered by the second portion of the first layer.

2. The package of claim 1, wherein the cut line further defines a pull tab of the second portion of the first layer.

3. The package of claim 1, wherein the second portion is removable from the sealing surface of the base member.

4. The package of claim 1, wherein the second portion comprises a tamper evidence feature.

5. The package of claim 1, wherein the lidding member comprises a pull tab.

6. The package of claim 1, comprising multiple first compartments.

7. The package of claim 1, comprising multiple second compartments.

8. The package of claim 1, wherein the PSA is flood coated between the first layer and the second layer of the lidding member.

9. The package of claim 8, wherein the force of the heat seal on the second portion is stronger than the adhesive force of the PSA.

10. The package of claim 1, wherein the area between the second portion of the first layer and the second layer is adhesive-free.

11. The package of claim 1, wherein the sealing surface comprises
    an inner flange and an outer flange; and
    a channel between the inner flange and the outer flange, wherein the outer flange defines an exterior edge.

12. The package of claim 11, wherein the PSA is aligned with the outer flange.

13. The package of claim 11, additionally comprising a third portion of the first layer which is permanently adhered to the second layer and is aligned with the channel.

14. A package comprising:
    a base member defining at least one compartment, the base member comprising a sealing surface formed by an inner flange and an outer flange, wherein the sealing surface defines a channel between the inner flange and the outer flange, wherein the outer flange defines an exterior edge; and
    a lidding member which covers the at least one compartment in a closed configuration, the lidding member comprising a first layer and a second layer laminated to the first layer via an adhesive layer, wherein the adhesive layer comprises at least a pressure sensitive adhesive (PSA) in a perimeter region of the lidding member aligned with the outer flange, and
    a cut line through the first layer which defines
       a first portion of the first layer which is permanently adhered to the second layer and is aligned with the channel, and
       a second portion of the first layer, wherein the second portion
          is not permanently adhered to the second layer,
          is heat sealed to the inner flange of the sealing surface of the base member and covers the at least one compartment; and
    wherein when the lidding member is peeled away from the sealing surface, the at least one compartment remains covered by the second portion of the first layer.

15. The package of claim 14, comprising multiple compartments of the said at least one compartment.

16. The package of claim 14 additionally comprising a third portion of the first layer which is permanently adhered to the second layer and covers at least a portion of at least one additional compartment.

17. The package of claim 16 wherein when the lidding member is peeled away from the sealing surface, the at least one additional compartment is opened.

18. The package of claim 16, comprising multiple compartments of the said at least one additional compartment.

19. The package of claim 14, wherein the cut line further defines a pull tab of the second portion of the first layer.

20. The package of claim 14, wherein the second portion is removable from the inner flange of the sealing surface of the base member.

* * * * *